Patented Mar. 28, 1944

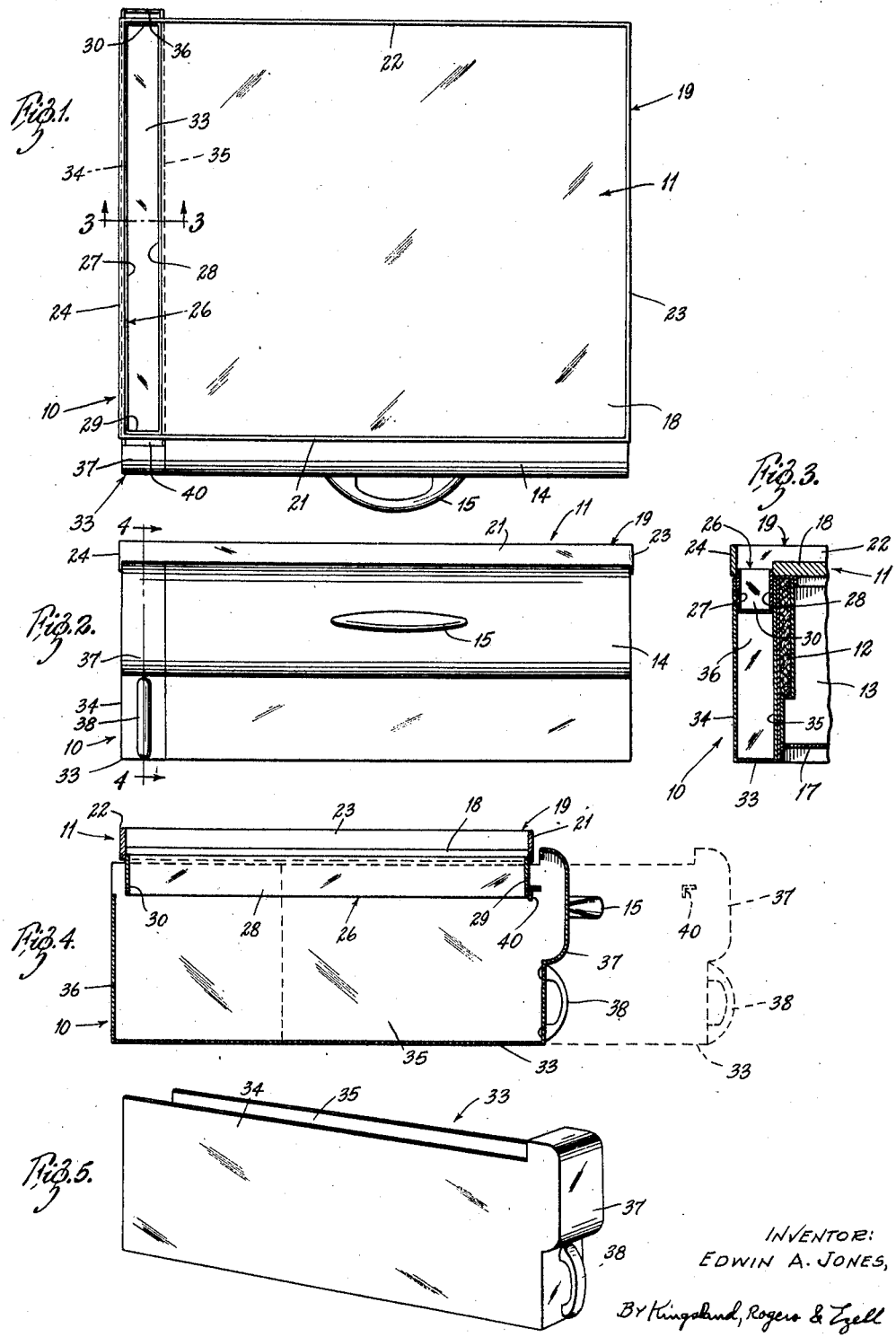

2,345,480

UNITED STATES PATENT OFFICE 2,345,480

DRIP PAN CONSTRUCTION

Edwin A. Jones, Webster Groves, Mo., assignor to Majestic Manufacturing Co., St. Louis, Mo., a corporation of Missouri Application October 20, 1941, Serial No. 415,685

2 Claims. (Cl. 99—425)

The present invention relates generally to cooking appliances, and more particularly to a drip pan construction employed in operative relationship with and in combination with a cooking device.

An object of the present invention is to provide a novel drip pan construction which is adapted to be operatively associated with a cooking appliance.

Another object is to provide a novel drip pan construction which finds particular use with a counter-cooking appliance of the griddle type.

Another object is to provide a novel drip pan construction which includes a drawer or pan that is separate and outside the cooking appliance with which the construction is associated.

Another object is to provide a novel drip pan construction adapted to be disposed along the side of a cooking appliance with which it is operatively associated.

Another object is to provide a novel drip pan construction which is proof against the spilling of grease, and the like, into the interior of the cooking device with which it is associated.

Another object is to provide a novel drip pan combination in which the flange of the cooking unit surrounds the drip pan construction.

Another object is to provide a novel removable drip receptacle which cannot be tilted in any direction during removal.

Another object is to provide a novel drip pan construction which is exterior of the cooking appliance with which it is operatively associated.

Another object is to provide a novel drip pan construction of a drawer type.

Other objects are to provide a novel drip pan construction which is simple in its features, positive in its operative functions, and of a construction to fulfill the objects and advantages sought therefor.

Other objects and advantages are apparent from the following description taken in conjunction with the accompanying drawing in which:

Fig. 1 is a plan view of a preferred embodiment of the present drip pan construction integrated with a counter-griddle;

Fig. 2 is a front view of the drip pan and griddle construction shown in Fig. 1;

Fig. 3 is a section on the line 3—3 of Fig. 1;

Fig. 4 is a section on the line 4—4 of Fig. 2; and

Fig. 5 is a perspective view of the removable drip pan receptacle.

Referring to the drawing more particularly by reference numerals, 10 indicates generally a drip pan construction embodying the concepts of the present invention, and 11 a counter-griddle.

The heating elements, which may be gas, electric, or other type, the valves, the controls, et cetera, of the griddle 11 are not shown since they neither form part nor are necessary for a full disclosure of the present invention. The griddle 11 includes side walls 12 of the insulated type, a rear wall 13, a front face 14 having a handle 15, a bottom 17, and a cooking plate 18 around which extends and to which is welded a vertical rim or flange 19. The flange 19 includes a front section 21, a rear section 22, and a side section 23 which are contiguous to the plate 18. The sections 21 and 22 extend beyond the edge of the plate remote from the section 23 to support a second side section 24 spaced from the plate 18.

A rectangular shallow chute 26 is welded along its sides 27 and 28 and ends 29 and 30 to the section 24, the plate 18, and the sections 21 and 22, respectively. The chute 26 may be formed integral with the plate 18 or the flange 19. The side 28 is spaced a small amount from the outer surface of the side wall 12.

A drip receptacle or grease drawer 33 cooperates with the chute 26 and is adapted to be disposed adjacent the outer side wall 12 when operatively located. The receptacle 33 includes side walls 34 and 35, an end wall 36, and a front wall 37 which supports a handle 38. The front wall 37 is of the same configuration as the face 14 of the griddle 11. As is clear from the drawing, the side walls 34 and 35 are of a depth to extend from the bottom plane of the griddle 11 into an overlapping relationship with the sides 27 and 28 of the chute 26, and are of a length to dispose the end wall 36 rearward of the back of the griddle 11. The end wall 36 is cut away to permit the receptacle 33 to be slid into or out of place.

A strut member 40 extends across the receptacle 33 towards the front and is secured to the side walls 34 and 35. The member 40 contacts the front end 29 of the chute 26 to limit the rearward movement of the receptacle 33.

In use, the receptacle 33 receives grease, and the like, from the cooking surface of the plate 18 which passes through the chute 26 before falling therein. Since the receptacle 33 is completely exteriorly of the interior of the griddle 11, no grease, or the like, can find a way into the interior of the griddle 11. Should the user of the griddle 11 permit the refuse level to rise above the height of the rear wall 36, any overflow will pass directly to the surface supporting the griddle 11.

However, there is small chance of this overflow since the open nature of the chute 26 permits observation of the refuse level in the receptacle 33 at all times. Furthermore, the capacity of the receptacle 33 is so great that it is not required to be emptied often. The extra length of the receptacle 33 prevents grease from dripping directly to the surface supporting the griddle 11.

When the receptacle 33 obtains a substantial amount of grease, and the like, it is pulled forward from its position of rest by means of the handle 38, the overlapping engagement of its side walls 34 and 35 with the sides 27 and 28 of the chute 26 forming both a guide and means of maintaining the receptacle 33 upright in this removal operation. The closeness of the end wall 36 to the lower edge of the chute 26 aids in the latter function. The receptacle 33 may then be emptied and returned to its grease-receiving position.

It is manifest that the present drip pan construction fulfills all of the objects and advantages sought therefor. It is also clear that changes in configuration and material of the elements of the exemplification may be made without departure from the invention, for it is to be understood that the foregoing description and the accompanying drawing have been given by way of illustration and example and not for purposes of limitation, the invention being defined by the accompanying claims.

I claim:

1. In combination, a cooking device including a casing, a plate thereon to receive grease, a side wall thereon toward which the grease may flow, means extending from the casing to provide an opening adjacent the side wall, a chute secured in said opening with an upper edge disposed no higher than the edge of the plate to receive grease therefrom, said chute depending for a substantial distance below the said edge to provide guide walls, a substantially open top grease receptacle having a side wall adapted to be disposed adjacent the side wall of the device, and having a lower wall upon which it is supported independently of the chute, the receptacle having upper side walls substantially vertical to lie against the depending walls of the chute and to engage at least one for a substantial vertical distance to give lateral support to the receptacle and to prevent its wobbling, and said contiguous walls of the chute and receptacle being shaped to permit withdrawal of the receptacle with the upper side walls of the receptacle sliding along the depending walls of the chute.

2. In combination, a cooking device, a plate thereon to receive grease, said plate having a grease disposing edge, depending grease flow means supported on the cooking device at said edge extending downwardly from the plate a substantial distance, said grease flow means providing a first substantially vertical guide wall, a substantially open top grease receptacle having a substantially vertical side wall engageable with the guide wall, the latter extending down into the receptacle to conduct the grease thereinto, the receptacle having a lower supporting wall upon which it is supported to hold its side wall adjacent said guide wall as aforesaid, a second substantially vertical wall supported on the cooking device, and spaced from the guide wall, said guide wall and second wall providing positioning means to receive the grease receptacle to permit sliding withdrawal thereof, said positioning means providing opposed substantially vertical slide walls having a sufficient vertical extent to engage the upper part of the receptacle over a sufficient vertical and horizontal distance to prevent wobbling and tipping of the receptacle.

EDWIN A. JONES.